United States Patent [19]
Wood et al.

[11] 4,071,895
[45] Jan. 31, 1978

[54] NAVIGATIONAL DISPLAY SYSTEM

[75] Inventors: Kenneth E. Wood; James T. O'Farrell, both of Annapolis, Md.

[73] Assignee: Westinghouse Electric Corporation, Pittsburgh, Pa.

[21] Appl. No.: 713,179

[22] Filed: Aug. 10, 1976

[51] Int. Cl.² .............................................. G01S 7/04
[52] U.S. Cl. ............................ 364/449; 343/112 PT; 358/103
[58] Field of Search ................. 235/150.27; 244/77 R; 343/112 R, 112 C, 112 D, 112 PT; 358/103

[56] References Cited

U.S. PATENT DOCUMENTS

| 3,215,823 | 11/1965 | Ariessohn et al. | 235/150.27 |
| 3,685,053 | 8/1972 | Kirkpatrick | 343/112 PT X |
| 3,754,248 | 8/1973 | Case et al. | 343/112 PT X |
| 3,860,791 | 1/1975 | Headle, Jr. | 235/150.27 X |
| 3,967,098 | 6/1976 | Harnagel et al. | 235/150.27 X |
| 3,988,734 | 10/1976 | Elwood | 235/150.27 X |

Primary Examiner—Edward J. Wise
Attorney, Agent, or Firm—D. Schron

[57] ABSTRACT

The position of a carrier from a navigational reference generates X,Y coordinate navigation signals which are scaled as distance along a TV line of a TV display and a line number in the frame of the TV picture. A continual updated track of a moving vehicle is therefore displayed on a TV monitor, and if a video disc is used, can be recalled from the non-volatile memory for later replay.

12 Claims, 6 Drawing Figures

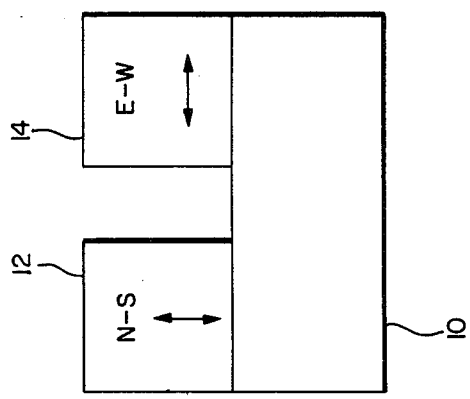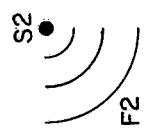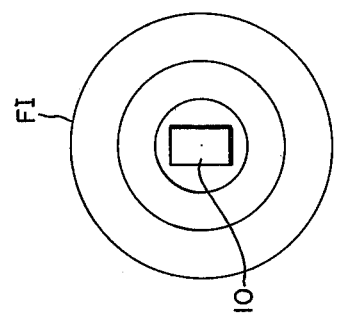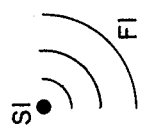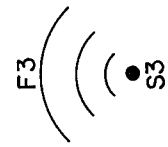
FIG. 1A
FIG. 1B

NAVIGATIONAL DISPLAY SYSTEM

BACKGROUND OF THE INVENTION

1. Field of the Invention

The invention in general relates to navigational systems and particularly to a display therefor.

2. Description of the Prior Art

Navigational systems exist which compute the coordinates of a carrier relative to a navigational reference and then display those coordinates for the carrier's position on some type of readout display.

For example, one type of display provides a numeric readout of the carrier's position and updates that readout during the course of the carrier's travel. In another type of system, the total navigational track of the carrier is displayed on a direct view storage tube. However, for some applications these direct view storage tubes have a relatively low resolution for the costs involved thus somewhat degrading the positional accuracy displayed.

The present invention provides a display system with high accuracy and high resolution for relatively low cost.

SUMMARY OF THE INVENTION

The apparatus of the present invention may utilize a conventional TV monitor for the display of navigational positions and the total navigational track of a carrier. In response to first and second navigation signals indicative of the position of the carrier relative to a navigational reference, there is generated two values, one being a scaled quantity across a TV line, and the other being a scaled quantity between zero and L where L is the number of active TV lines in the TV picture. The calculated values are placed into a storage where an entire TV picture is built up and the signals are displayed as a mark on the TV picture at the appropriately calculated TV line and distance along that line. Subsequently generated and displayed marks then describe the total navigational track of the carrier.

BRIEF DESCRIPTION OF THE DRAWINGS

FIGS. 1A and 1B show two types of navigational systems;

DESCRIPTION OF THE PREFERRED EMBODIMENT

In FIG. 1A, a carrier 10 positioned relative to three stations S1, S2 and S3 transmits an interrogation signal FI and in response thereto each of the stations will transmit a characteristic frequency F1, F2 or F3. By way of example, carrier 10 may be a surface vessel and S1, S2 and S3 may be transponders. Appartus on the carrier then calculates the time of arrival and more particularly the difference in times of arrival of the transponder transmitted frequencies so as to enable calculation of the carrier's position relative to some reference.

Another type of system, as illustrated in FIG. 1B, includes magnetic sensors 12 and 14 which provide signals to apparatus on the carrier 10. That is, the distance in any direction may be broken down into X and Y coordinates and sensor 12 will provide a signal indicative of distance traveled in a North-South direction while sensor 14 provides the information relative to an East-West direction.

Figure 2:
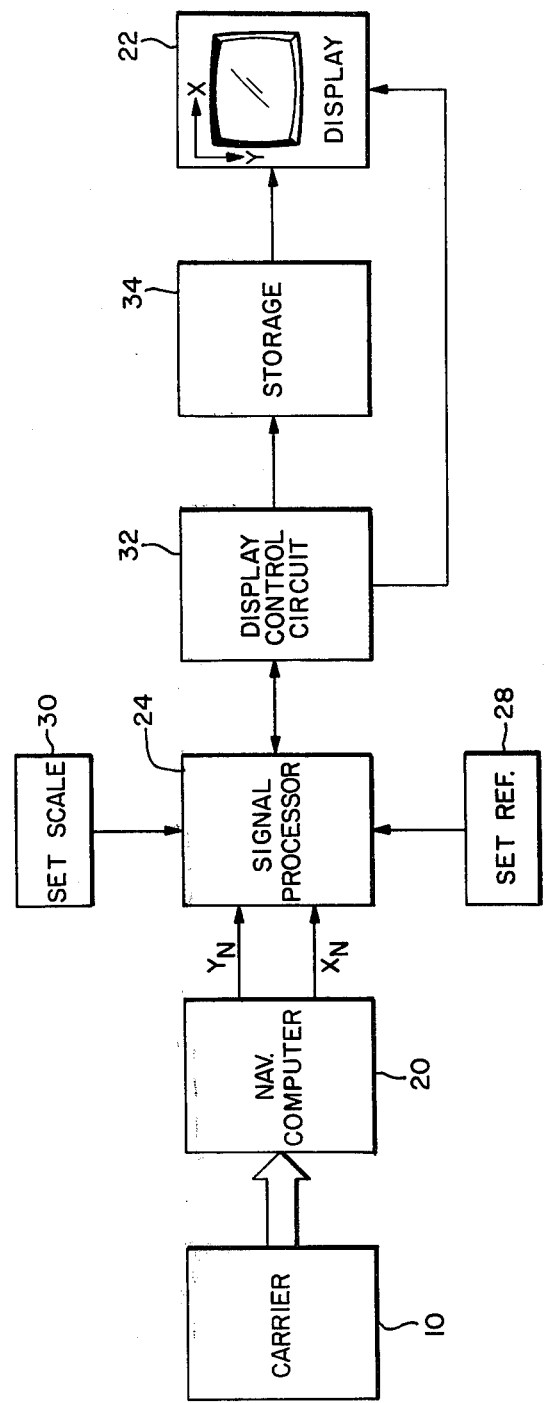
FIG. 2 is a block diagram illustrating the process of obtaining navigational signals and presenting them on a display.

As illustrated in FIG. 2 the derived information is provided to a navigational computer 20 which in response to the frequency signals or sensor signals provides first and second coordinate navigational signals $Y_N$ and $X_N$. These signals will be portrayed on display 22 which is a conventional TV monitor having an X,Y display made up of a clurality of scanned TV lines, each line being divisible into a plurality of adjacent elemental portions, or equal time increments.

Signal processor 24 is provided to properly convert and scale the navigational signals for presentation on the display. For convenience, a display reference may be portrayed in the TV picture at any desired location governed by the reference set circuit 28, and the maximum X distance relative to the width of the TV picture and the maximum Y distance relative to the height of the TV picture is governed by the input of the scale set circuit 30.

The output of the signal processor circuit 24 is provided to display control circuit 32 which generates the mark to be written on the display at the proper time in the picture presentation and provides this indication to storage means 34 which is utilized to store the line signals to be displayed on the TV picture so that a total navigational track may be presented.

Although the storage means 34 may under certain circumstances be a solid state storage device, one convenient and relatively inexpensive storage device for TV signals is the commercially available video disc and the operation of the present invention will be described by way of example with such disc apparatus.

Figure 3:
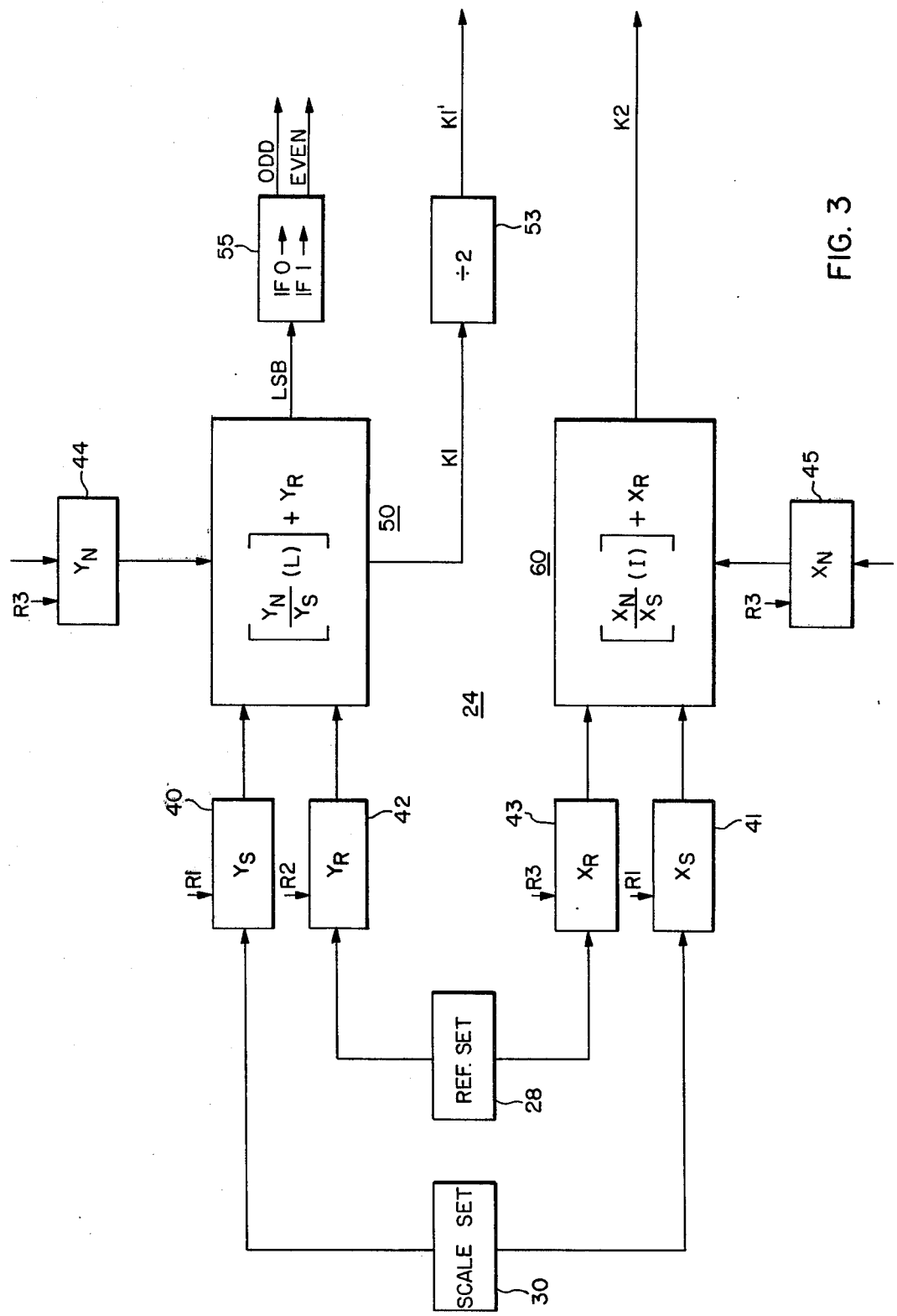
FIG. 3 is a block diagram illustrating the signal processor in more detail.

Various operational components of the signal processor circuit 24 is illustrated in FIG. 3. The signal processor includes a plurality of registers 40 and 45 for storing various signal values. The scale set circuit 30 may be a plurality of manually operated switches for setting the distance scale to be displayed and the chosen numbers are placed into respective registers 40 and 41 for storing the $Y_S$ and $X_S$ scale values.

Similarly, reference set circuit 28 is manually operated to place display reference coordinate values $Y_R$ and $X_R$ into respective registers 42 and 43.

The Y coordinate navigation input signal $Y_N$ is received by register 44 and the X coordinate navigation signal $X_N$ is received by register 45 with all of the registers being resettable by the respective signals R1, R2 and R3.

Circuit 50 receives the first navigational signal $Y_N$ and computes and provides a line number signal K1 where $$K1 = \frac{Y_N}{Y_S}(L) + Y_R$$

and where:

$Y_N$ is the first navigation signal $Y_S$ is the scale of the display in the Y direction L is the number of TV lines displayed $Y_R$ is the number of TV lines to the display reference point If the display is a conventional TV monitor operating in a 2 to 1 interlace mode wherein two fields are provided per frame, then the line number K1 representing the total number of displayed lines to a certain point will have to be divided in half since the total number of displayed lines in such interlaced system is made up half of odd field lines and half of even field lines. Accordingly, with a 2 to 1 interlace system, the value of K1 is divided in half by circuit 53 to obtain K1'. In one construction of the apparatus, the numbers operated upon may be binary numbers and the division by 2 may simply be a shift of the binary answer K1 by one place.

In order that the number be written into the appropriate odd or even field, the present apparatus examines the least significant bit of the results of the calculation of circuit 50 and if it is zero, circuit 55 will provide a signal indicative of an odd field write command and if the least significant bit is a one, circuit 55 will provide an even field write command.

By way of example, let it be assumed that three successive calculations of K1 due to three successive input signals yields results of 14, 15 and 16, or, in binary notation, 1110, 1111, and 10000. The respective least significant bits of these numbers are 0,1 and 0 and division by 2 of the numbers yields 7,7 and 8. According to the formula of writing on the odd field if the least significant bit is a zero and on the even field if it is a one, the apparatus will cause a writing on three successive display lines 13, 14 and 15. If the reverse procedure were followed, the successive writing would be on lines 14, 13 and 16. Although the writing is displaced one line from the actually calculated line number, for most situations this accuracy is sufficient, however, if higher accuracy is required, a one line shift downward can be provided electronically.

In a manner similar to circuit 50, circuit 60 will compute and provide an increment number signal K2 where $$K2 = \frac{X_N}{X_S}(I) + X_R$$

and where:
$X_N$ is the other navigational signal
$X_S$ is the scale of the display in the X direction
I is the number of equal time increments in a TV line
$X_R$ is the number of equal time increments to the display reference point.

Figure 4:
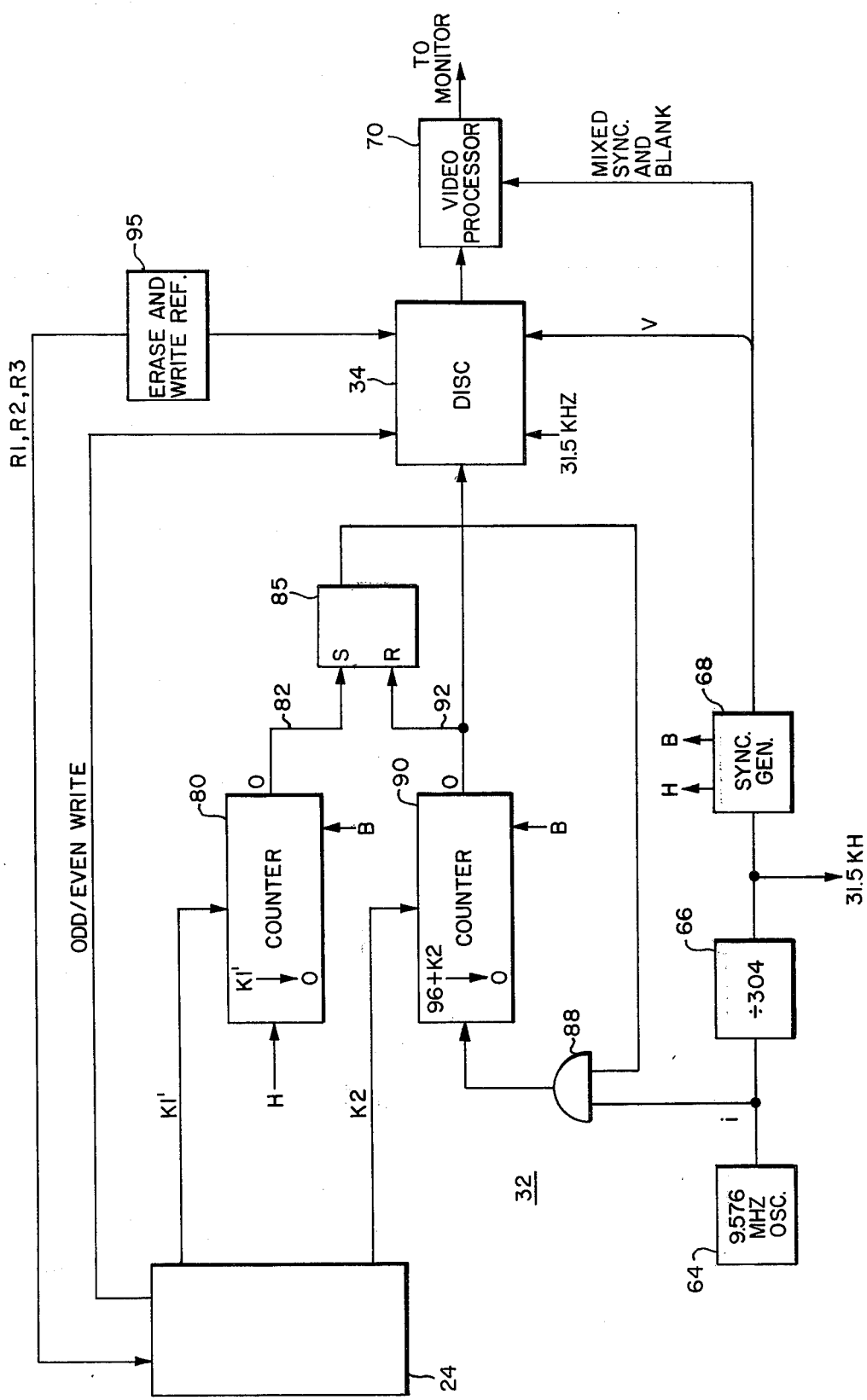
FIG. 4 is a block diagram illustrating the display control circuit of FIG. 2 in more detail.

FIG. 4 illustrates in block diagram form an embodiment of the display control circuit 32 and by way of example let it be assumed that the number of displayed TV lines L is 485 and the number of equal time increments in a displayed line is 512 with an additional 96 increments of the TV line being in the non-displayed sync interval. In one TV line time, oscillator 64 will provide an output pulse for each increment and for a 63.5 microsecond TV line (10 microsecond blanking, 53.5 microsecond active), oscillator 64 will have a frequency of 9.576 megahertz. The output i is divided by 304 in divider circuit 66 to yield an output signal having a frequency of 31.5 kilohertz (twice the TV line frequency) this signal being provided to sync generator 68 which in a well known manner will provide a number of signals including mixed sync and blanking to a video processor 70, a vertical sync signal V, a horizontal sync signal H and a vertical blanking signal B. The provision of these signals, operation of the disc, and combining the output signal from the disc with mixed sync and blanking are well known state of the art techniques.

After calculation of the line number signal, the number is transferred from signal processor 24 to a down counter 80 which is reset upon the occurence of each vertical blanking signal B for the vertical blanking period and is thereafter decremented by one count in response to each line count (signal H). Thus suppose the calculated number provided to counter 30 is the number 20. After 20 horizontal lines have occurred from the beginning of the active portion of the TV field, counter 80 will provide an output signal on line 82 to place a flip-flop 85 into a set state of operation which enables AND gate 88. The enabling of AND gate 88 allows the output from oscillator 64 to be provided to a second down counter 90 which receives the increment number signal K2 from signal processor 24 and when the count of zero is attained will provide an output signal on line 92 to reset flip-flop 85 thus removing the enable from AND gate 88. For example, suppose that K2 is 400. Since 96 increments of a TV line is in the sync interval, down counter 90 may be designed to reset to a count of 96 and to count down from a value of 96 plus K2. Accordingly, after the correct line position has been reached, as determined by counter 80 and after 496 pulses of oscillator 64 has been counted, counter 90 will provide an output signal which not only resets flip-flop 85 but also inputs a signal to video disc 34 for writing on the display at the appropriate TV line and distance along that line. The resetting of down counter 90 may be accomplished with the commencement of each new field or as illustrated may be reset by the vertical blanking signal B.

The apparatus thereafter upon the occurrence of the next vertical blanking is ready to receive a next pair of scaled positional coordinates for a subsequent mark on the display whereby the total navigational track of the carrier is displayed. In acoustic systems because of the relatively slow speed of sound, it is possible that many TV frames will elapse before a new set of data is available from a sonar positioning system. The transmission of an interrogating signal in such system may be conveniently utilized to prime the apparatus for a new calculation.

The updated position on the display is relative to the display reference as the position of the carrier is relative to its navigational reference. In setting up the scales for the display consideration must be given to the total expected range of travel so that the track does not run off the display.

A new scale and a new display reference may be inserted in the apparatus by provision of the erase and write reference circuit 95 which provides the signals R1, R2 and R3 to signal processor 24 for resetting the indicated registers therein. The video disc in operation will continue to store the location of the marks and will readout to the monitor the scaled location of the carrier thus providing a continuous navigational track. The flickerless display will remain indefinitely until a frame erase is activated in the erase circuit 95.

Figure 5:
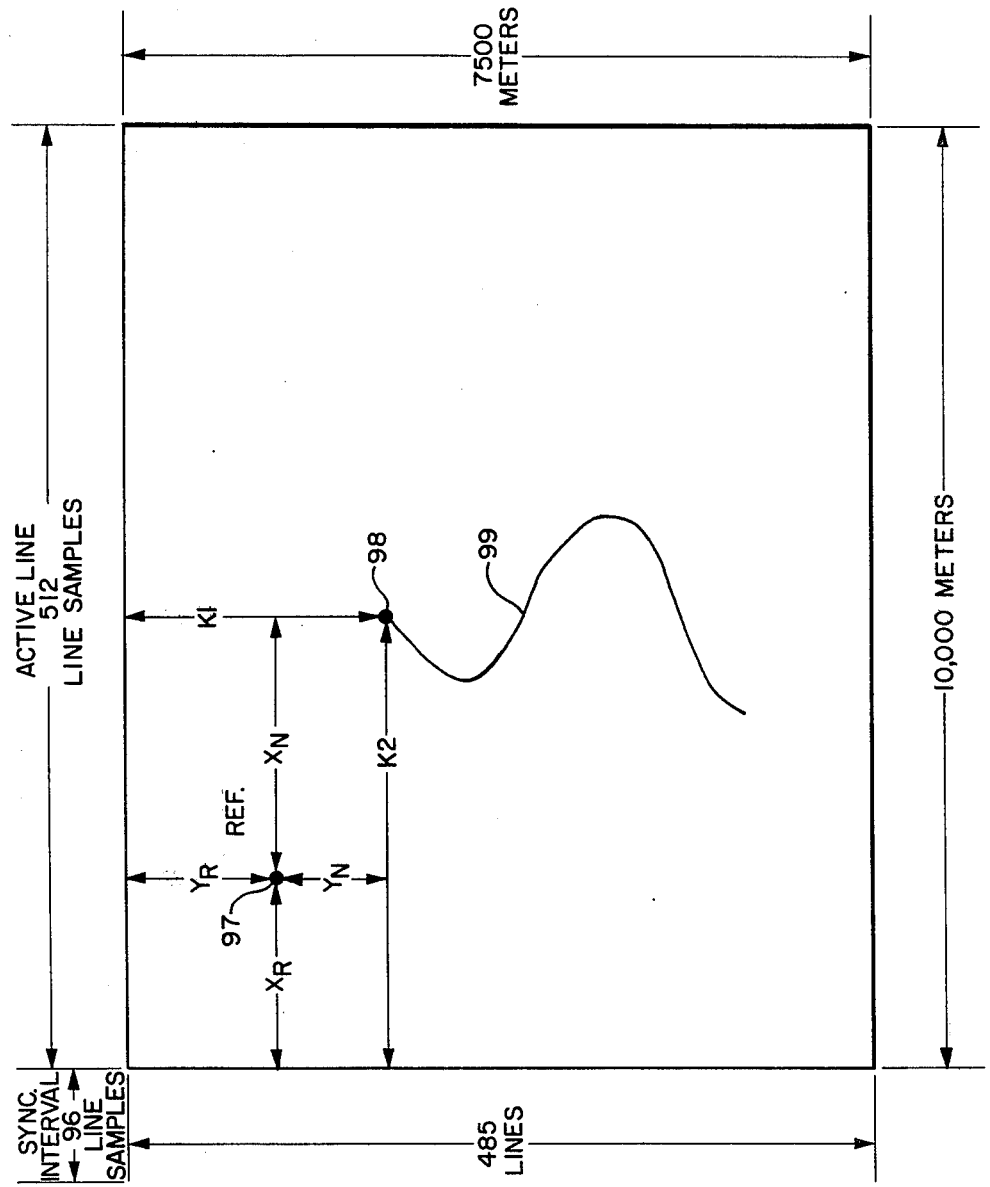
FIG. 5 illustrates a typical display.

FIG. 5 shows a typical X,Y display and for purposes of illustration, the X scale is 10,000 meters (containing 512 TV line increments) and the Y scale is 7500 meters containing 485 lines. The display reference point 97 is at a distance $Y_R$ from the top of the display and $X_R$ from the side of the display. A navigational mark 98 is illustrated as being displaced a distance $X_N$ from the reference in one coordinate and $Y_N$ in the other coordinate. The number of lines from the top of the picture to mark 98 is K1 and the number of increments along the line to the mark is K2. With each successive navigational input, successive marks are placed on the screen so that the total track 99 is displayed.

Although not shown, an appropriate graticule may be simultaneously displayed to facilitate in a quantitative interpretation of the carrier's position relative to the reference. Preferably this graticule would be stored on the video disc and displayed in the TV picture as opposed to an overlay since the stored graticule will then have the same finite distortion caused by imperfections in the display scanning circuits.

Accordingly, there has been described a relatively inexpensive and accurate system for displaying, with extremely high accuracy, the total navigational track of a carrier. The carrier may be a person in which case the navigation signals may be transmitted to a remote location for processing and display, or the carrier may be a vehicle in which case the navigational signals may be transmitted to a remote location or the equipment may be carried by the vehicle itself.

We claim:

1. A navigational display system, comprising:
  A. a TV monitor;
  B. means for providing first and second coordinate navigation signals indicative of the position of said carrier relative to a navigational reference;
  C. means for converting said first navigation signal into a calculated scaled quantity between zero and L, where L is the number of active TV lines to be displayed on the monitor's TV picture;
  D. means for converting said second navigation signal into a calculated scaled quantity across a TV line; and
  E. means for displaying a mark in said TV picture at the appropriately calculated TV line and distance along that line.

2. Apparatus according to claim 1 which includes
  A. means for placing said display reference point in the TV picture.

3. A display system for indicating the total navigational track of a carrier, comprising:
  A. a TV monitor having an X-Y display made up of a plurality of scanned TV lines each line being divided into a pluarlity of adjacent equal time increments;
  B. storage means for storing signals to be displayed on said TV monitor;
  C. means for providing first and second coordinate navigation signals indicative of the position of said carrier relative to a navigational reference;
  D. means responsive to one of said signals for generating a line number signal K1, where $$K1 = \frac{Y_N}{Y_S}(L) + Y_R$$

$Y_N$ is said first navigation signal
  $Y_S$ is the scale of said display in the Y direction
  L is the number of TV lines displayed
  $Y_R$ is the number of TV lines to a display reference point;
  E. means responsive to the other said navigation signal for generating an increment number signal K2, where $$K2 = \frac{X_N}{X_S}(I) + X_R$$

$X_N$ is said other navigation signal
  $X_S$ is the scale of said display in the X direction
  I is the number of adjacent equal time increments in a TV line
  $X_R$ is the number of adjacent increments to said display reference point;
  F. circuit means responsive to said line number signal and said increment number signal for placing into said storage means a display signal, the displayed position of which from said display reference point is substantially proportional to the actual position of said carrier relative to said navigational reference.

4. Apparatus according to claim 3 wherein
  A. said carrier is moving relative to said navigational reference; and
  B. repetitive first and second navigation signals are provided and in response thereto, repetitive K1 and K2 signals are generated.

5. Apparatus according to claim 3 wherein
  A. said storage means is a video disc.

6. Apparatus according to claim 3 wherein
  A. said Tv monitor operates on a 2 fields per frame standard;
  B. said circuit means includes means for dividing said K1 by 2.

7. Apparatus according to claim 6 wherein
  A. K1 is calculated as a binary number; and which includes
  B. means for writing said display signal on an even field if the least significant bit of said binary number is odd (1) and on an odd field if the least significant bit is even (0).

8. Apparatus according to claim 3 wherein said circuit means includes:
  A. means for providing signals indicative of the occurrence of a TV line (H), a vertical blanking period (B) and a TV line equal time increment (i);
  B. first means for receiving a line number signal and being responsive to said signal (H) for providing a first output signal when the number of signals (H) received equals said line number signal;
  C. second means for receiving an increment number signal and being responsive to said signal (i) for providing a second output signal when the number of signals (i) produced after the occurrence said first output signal equals said increment number signal;
  D. means for placing into said storage a display signal in response to said second output signal.

9. Apparatus according to claim 8 wherein
  A. said first and second means are first and second down counters each resettable to a predetermined value in response to a reset signal.

10. Apparatus according to claim 9 wherein
  a. said reset signal is said signal (B).

11. Apparatus according to claim 9 wherein
  A. said second down counter is reset to a number equivalent to the number of adjacent increments in the horizontal sync interval.

12. Apparatus according to claim 8 which includes
  A. gating means for receiving said (i) signal;
  B. a flip-flop circuit operable in response to said first output signal to provide an enable signal to said gating means so that said signal (i) may be provided to said second means;
  C. said flip-flop circuit being operable in response to said second output signal to remove said enable signal.

* * * * *